US008380719B2

(12) United States Patent
Chang et al.

(10) Patent No.: US 8,380,719 B2
(45) Date of Patent: Feb. 19, 2013

(54) SEMANTIC CONTENT SEARCHING

(75) Inventors: Eric I-Chao Chang, Beijing (CN);
Michael Todd Gillam, Silver Spring, MD (US); Yan Xu, Beijing (CN); Craig Feied, Washington, DC (US); Jonathan Handler, Northbrook, IL (US)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 12/818,286

(22) Filed: Jun. 18, 2010

(65) Prior Publication Data
US 2011/0314024 A1 Dec. 22, 2011

(51) Int. Cl.
*G06F 7/00* (2006.01)
*G06F 17/30* (2006.01)
(52) U.S. Cl. .................... 707/740; 707/731
(58) Field of Classification Search ............... None
See application file for complete search history.

(56) References Cited

U.S. PATENT DOCUMENTS

| | | | | |
|---|---|---|---|---|
| 5,301,109 A * | 4/1994 | Landauer et al. | | 704/9 |
| 5,625,767 A * | 4/1997 | Bartell et al. | | 345/440 |
| 5,983,170 A * | 11/1999 | Goodman | | 704/9 |
| 6,189,002 B1 * | 2/2001 | Roitblat | | 1/1 |
| 6,282,537 B1 * | 8/2001 | Madnick et al. | | 707/716 |
| 6,289,353 B1 * | 9/2001 | Hazlehurst et al. | | 1/1 |
| 6,553,365 B1 * | 4/2003 | Summerlin et al. | | 707/740 |
| 6,560,620 B1 * | 5/2003 | Ching | | 715/229 |
| 6,606,620 B1 | 8/2003 | Sundaresan et al. | | |
| 6,633,868 B1 * | 10/2003 | Min et al. | | 1/1 |
| 6,675,159 B1 * | 1/2004 | Lin et al. | | 1/1 |
| 7,024,400 B2 | 4/2006 | Tokuda et al. | | |
| 7,428,700 B2 * | 9/2008 | Wen et al. | | 715/239 |
| 7,509,572 B1 * | 3/2009 | Melander et al. | | 715/234 |
| 2001/0037324 A1 * | 11/2001 | Agrawal et al. | | 707/1 |
| 2002/0165839 A1 * | 11/2002 | Taylor et al. | | 706/20 |
| 2003/0028564 A1 * | 2/2003 | Sanfilippo | | 707/513 |
| 2004/0054521 A1 * | 3/2004 | Liu | | 704/5 |
| 2004/0148154 A1 * | 7/2004 | Acero et al. | | 704/1 |
| 2004/0148170 A1 * | 7/2004 | Acero et al. | | 704/257 |
| 2004/0162806 A1 * | 8/2004 | Liu | | 707/1 |
| 2004/0205448 A1 | 10/2004 | Grefenstette et al. | | |
| 2004/0249795 A1 * | 12/2004 | Brockway et al. | | 707/3 |
| 2005/0028077 A1 * | 2/2005 | Wen et al. | | 715/500.1 |
| 2005/0060140 A1 * | 3/2005 | Maddox | | 704/4 |
| 2005/0065930 A1 * | 3/2005 | Swaminathan et al. | | 707/6 |
| 2005/0114313 A1 * | 5/2005 | Campbell et al. | | 707/3 |
| 2005/0154761 A1 * | 7/2005 | Lee et al. | | 707/104.1 |

(Continued)

OTHER PUBLICATIONS

Learning Document-Level Semantic Properties from Free-Text Annotations, Branavan et al., Journal of Artificial Intelligence Research, 34, pp. 569-603, 2009.*

(Continued)

*Primary Examiner* — Augustine K Obisesan
(74) *Attorney, Agent, or Firm* — Microsoft Corporation

(57) ABSTRACT

One or more techniques and/or systems are disclosed that provide for document retrieval where a user can identify key attributes of potential target documents that are desirable (e.g., have a particular semantic content for the user). Further, relevant documents that comprise the desired semantic content can be retrieved. Additionally, the user can provide feedback on the retrieved documents, for example, based on key semantic concepts found in the documents, and the input can be used to update the classification. For example, this process can be iterated to improve the retrieval and precision of documents found through machine learning techniques.

20 Claims, 7 Drawing Sheets

U.S. PATENT DOCUMENTS

| | | | |
|---|---|---|---|
| 2006/0031217 A1* | 2/2006 | Smith et al. ................. 707/5 |
| 2006/0074998 A1* | 4/2006 | Chidlovskii ................. 707/201 |
| 2006/0110028 A1* | 5/2006 | Liu et al. ................. 382/159 |
| 2006/0143254 A1* | 6/2006 | Chen et al. ................. 707/205 |
| 2006/0235843 A1* | 10/2006 | Musgrove et al. ................. 707/6 |
| 2007/0106651 A1* | 5/2007 | Isaacson et al. ................. 707/3 |
| 2007/0112556 A1* | 5/2007 | Lavi et al. ................. 704/9 |
| 2007/0162272 A1* | 7/2007 | Koshinaka ................. 704/9 |
| 2007/0174270 A1* | 7/2007 | Goodwin et al. ................. 707/5 |
| 2007/0198447 A1* | 8/2007 | Tilford et al. ................. 706/20 |
| 2007/0203885 A1* | 8/2007 | Kim et al. ................. 707/2 |
| 2007/0208719 A1 | 9/2007 | Tran |
| 2008/0086433 A1 | 4/2008 | Schmidtler et al. |
| 2008/0109454 A1 | 5/2008 | Willse et al. |
| 2008/0275870 A1 | 11/2008 | Shanahan et al. |
| 2008/0281841 A1* | 11/2008 | Swaminathan et al. ....... 707/100 |
| 2008/0319649 A1* | 12/2008 | Nath ................. 701/205 |
| 2008/0319973 A1* | 12/2008 | Thambiratnam et al. ......... 707/5 |
| 2009/0024385 A1* | 1/2009 | Hirsch ................. 704/9 |
| 2009/0028441 A1* | 1/2009 | Milo et al. ................. 382/218 |
| 2009/0157611 A1* | 6/2009 | Kipersztok ................. 707/3 |
| 2009/0216738 A1* | 8/2009 | Dexter et al. ................. 707/5 |
| 2009/0300046 A1* | 12/2009 | Abouyounes ................. 707/102 |
| 2010/0005087 A1* | 1/2010 | Basco et al. ................. 707/5 |
| 2010/0198864 A1* | 8/2010 | Ravid et al. ................. 707/769 |
| 2011/0271232 A1* | 11/2011 | Crochet et al. ................. 715/810 |

OTHER PUBLICATIONS

Extracting Semantic Structure of Web Documnets Using Content and Visual Information, Mehta et al., WWW2005, May 10-14, pp. 928-929, 2005.*

Managing Semantic Content for the Web, Sheth et al., IEEE Internet Computing, pp. 80-87, Jul.-Aug. 2002.*

Automatic Reassembly of Documnet Fragments via Context Based Statistical Models, Shanmugasundaram et al. Proceedings of the 19th Annual Computer Security Application COnference (ACSAC 2003), 2003.*

Conceptual framework for document semantic modelling: an application to document and knowledge management in the legal domain, Jouve et al., Data & Knowledge Enginering, 46, 345-375, 2003.*

Enhanced Web Document Summarization Using Hperlinks, Delort et al., HT'03, Aug. 26, 2003.*

Query-topic focused web pages summarization PRICAI 2006 : trends in artificial intelligence : Proceedings of 9th Pacific Rim International Conference on Artificial Intelligence, Yeol Yoo et al, Guilin, China, Aug. 7-11, 2006.*

A survey in semantic web technologies-inspired focused crawlers, Chang et al. Third International Conference on Information Management (ICDIM), pp. 934-936, 2008.*

"International Search Report", Mailed Date: Jan. 2, 2012, Application No. PCT/US2011/039317, Filed Date: Jun. 6, 2011, pp. 8.

Raghavan, et al., "Active Learning with Feedback on Both Features and Instances", Retrieved at <<http://jmlr.csail.mit.edu/papers/volume7/raghavan06a/raghavan06a.pdf>>, Journal of Machine Learning Research, vol. 7, Aug. 2006, pp. 1655-1686.

Cao, et al., "Adapting Ranking SVM to Document Retrieval", Retrieved at <<http://net.pku.edu.cn/~course/cs410/reading/Cao-et-al-SIGIR2006.pdf>>, Annual ACM Conference on Research and Development in Information Retrieval, Proceedings of the 29th annual international ACM SIGIR conference on Research and development in information, Aug. 6-11, 2006, pp. 8.

Sebastiani, Fabrizio., "Machine Learning in Automated Text Categorization", Retrieved at <<http://nmis.isti.cnr.it/sebastiani/Publications/ACMCS02.pdf>>, ACM Computing Surveys, (CSUR), vol. 34, No. 1, Mar. 2002, pp. 1-47.

Xu, et al., "AdaRank: A Boosting Algorithm for Information Retrieval", Retrieved at <<http://citeseerx.ist.psu.edu/viewdoc/download?doi=10.1.1.67.5147&rep=rep1&type=pdf >>, Annual ACM Conference on Research and Development in Information Retrieval, Proceedings of the 30th annual international ACM SIGIR conference on Research and development in information retrieval, Jul. 23-27, 2007, pp. 391-398.

Truong, et al., "Learning to Rank with Partially Labeled Training Data", Retrieved at <<http://eprints.pascal-network.org/archive/00002637/01/Lm2RnkwithPartLblTmdata-Inscit06.pdf >>, Proceedings of the 1st International Conference on Multidiciplinary Information Science and Technologies (InSciT), 2006, pp. 5.

* cited by examiner

SEMANTIC CONTENT SEARCHING

BACKGROUND

Document retrieval in an enterprise setting can be a very important issue, particularly when one wishes to find critical information in a timely manner. For example, in a healthcare setting, it may be useful to find relevant alternate cases for a case that a doctor is currently working on, such as to find a pattern and/or particular treatment. As an example, the doctor may be interested in finding previous patients who are both smokers and have allergy to aspirin. Typically, document searching involves keyword searching where a relevant word that may be found in a document is input to a search engine, and those documents that comprise the keyword are retrieved. Document retrieval can be performed on an enterprise database, such as a hospital, a distributed database, and online resources, such as the Internet.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Currently, free-text searching, such as by keyword, often results in too few or too many results. As an example, when performing a keyword search using an Internet-based search engine millions of results can be returned. Reviewing the returned results for a keyword search can be time consuming, and often frustrating, as relevant information is often lacking in returned document. For example, a user may be looking for documents with words or phrases that have particular connotations, but the search engine returns irrelevant documents that may comprise the same keywords, but having different meaning. As a further example, English words and phrases often use the same words that have completely different meanings (e.g., bass could mean a fish, instrument, or shoe). However, a user may wish to quickly retrieve critical information from a large database.

Accordingly, one or more techniques and/or systems are disclosed herein that provide for document retrieval where the user can identify the key attributes of potential target documents that are desirable (e.g., have a particular semantic content for the user). Further, relevant documents that comprise the desired semantic content can be retrieved. Additionally, the user can provide feedback on the retrieved documents, for example, based on key semantic concepts found in the documents, and the input can be used to update the classification. For example, this process can be iterated to improve the retrieval and precision of the documents found through machine learning techniques.

In one embodiment for document searching by semantic content, an end user selection is received of a desired first portion of an initial document from a database comprising potential target documents, where the initial document comprises metadata labels that describe attributes of components of the initial document, and the selected first portion comprises components of the initial document that have desired semantic content for the user. The initial document, along with the selected first portion, is run through one or more trained classifiers in order to identify a first potential target document from the database that has a second portion which comprises a same semantic content as the first portion (e.g., selected by the user).

In this embodiment, if the second portion does not have the same semantic content as the first portion, an end user selection is received of a third portion of the first potential target document, where the third portion comprises the same semantic content as the first portion. Further, the first potential target document, along with the selected third portion, is run through the one or more trained classifiers to identify a second potential target document from the database, where the second potential target document has a fourth portion that has the same semantic content as the third portion.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
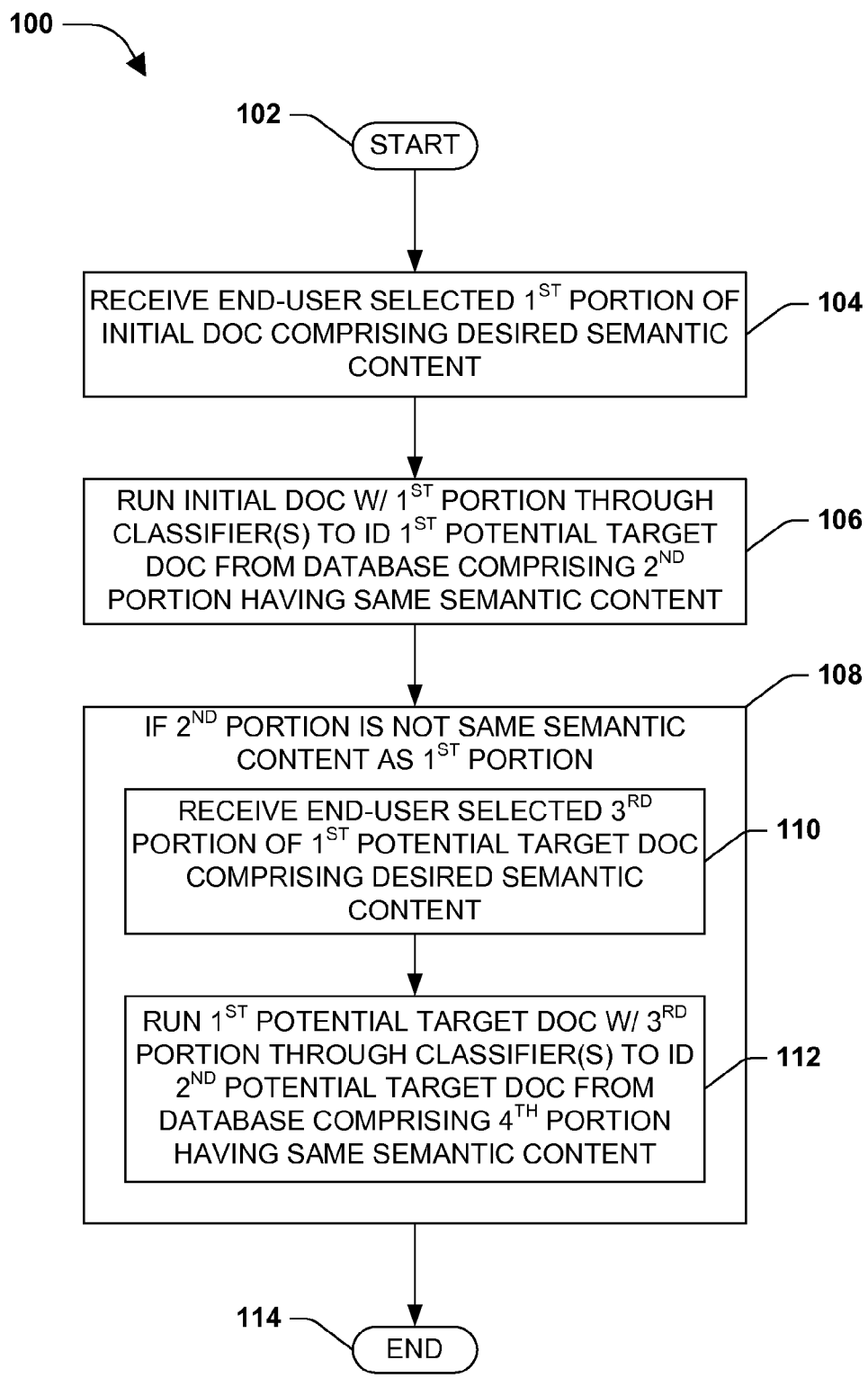
FIG. 1 is a flow diagram of an exemplary method that provides for document searching by semantic content.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 that provides for document searching by semantic content. The exemplary method 100 begins at 102 and involves receiving an end user selection of a desired first portion of an initial document from a database comprising potential target documents, at 104. Here, the initial document comprises metadata labels that describe attributes of components of the initial document (e.g. words), and the selected first portion comprises components of the initial document that have desired semantic content.

For example, a document can be parsed in order to determine a grammatical structure for the document. That is, a document may comprise a sequence of tokens, such as words, and the sequence(s) can be tokenized into individual components, and the components labeled according to their grammatical structure (e.g., type of word, such as noun, verb). Further, some types of parsing may allow a particular context to be determined for respective components (e.g., a medical term, an engineering term, etc.). In one embodiment, the documents in the database may have been previously parsed in accordance with a user's desired use, and respective components (e.g., words, text blocks, etc.) are labeled with metadata labels that can describe their type and even context, for example.

Further, in one embodiment, a user can select a portion of the document that comprises desired semantic content. That is, for example, the user may select a portion of a radiology report that identifies a recommended follow-up within three weeks. In this example, the recommendation of having the patient return for a follow-up visit within three weeks comprises semantic content, in that it has a particular meaning in context with the surrounding words and the radiology report. For example, the recommendation of a follow-up may be written is several different ways, but the meaning that the words connote a very specific. As another example, a diagnosis section of a doctor's report may include words such as "the diagnosis is . . . ;" "I think the patient has . . . ;" "the findings indicate . . . ;" or many other variations. However, again, the meaning of the diagnosis can be very specific.

In one embodiment, the initial document may be selected by the end user, such as a doctor, or some other end user that wishes to identify a plurality of documents in a database having a particular semantic content. For example, an end user may be tasked with identifying the customer report documents in an enterprise's database where a complaint was identified that involved poor response time. In this example, the poor response time comprises semantic meaning that could be written in a variety of ways. In the past, an IT professional may be called to set up a search, train a classifier, run tests, reset and adjust the system to identify the desired documents. In this embodiment, the end user, such as an administrative assistant, customer service representative, or another, for example, may select the desired semantic content to identify the desired documents.

At 106, the initial document, which has the selected first portion, is run through one or more trained classifiers in order to identify a first potential target document from the database. In this embodiment the first potential target document has a second portion that has a same semantic content as the first portion, which was selected by the end user. For example, one or more classifiers may be trained to identify words in a document using a variety of techniques, such as Hidden Markov Model (HMM), Support Vector Machines (SVMs), Conditional Random Fields (CRF), Statistical Language Models, and others.

Here, for example, the classifier(s) can attempt to identify a target document from the database that has the same semantic content identified by the end-user in the initial document. Further, in this example, the classifier(s) can attempt to highlight a portion of the target document (second portion) that comprises the same semantic content as the portion highlighted by the end-user (first portion). In this way, the classifiers are used to find documents having the content desired by the end-user, which may or may not use the same words, but has a same meaning, for example.

At 108 in the exemplary method 100, if the second portion does not have the same semantic content as the first portion, an end user selection of a third portion of the first potential target document is received, where the third portion comprises the same semantic content as the first portion, at 110. For example, the portion of the target document highlighted by the classifier(s) may not have the same desired semantic content as that selected by the end-user from the initial document. That is, the classifier may have misclassified the semantic content and selected content from the retrieved target document that does not match the end-user's desired content.

As an example, when the classifier(s) returns misclassified content the user can review the target document and select content (third portion) that corresponds to the their desired semantic content (e.g., same as first portion from initial document). At 112, the first potential target document, which has the selected third portion, can be run through the one or more trained classifiers to identify a second potential target document from the database. Here, the second potential target document comprises a fourth portion that has the same semantic content as the third portion.

As an example, the first document returned by the classifier(s) is reviewed by the end-user, after determining that the classifier(s) did not identify the correct content, they highlight the correct content and rerun it through the classifier(s). The classifier(s) can then return another document from the database with a highlighted portion that has the end-user's desired semantic content. In one embodiment, the step at 108 can be iterated, for example, until a desired semantic content is retrieved by the classifier(s) for a target document from the database. In this way, in this example, the classifier(s) can be further trained to identify the end-user's desired semantic content.

Having identified a target document having a desired semantic content, the exemplary method 100 ends at 114.

Figure 2:
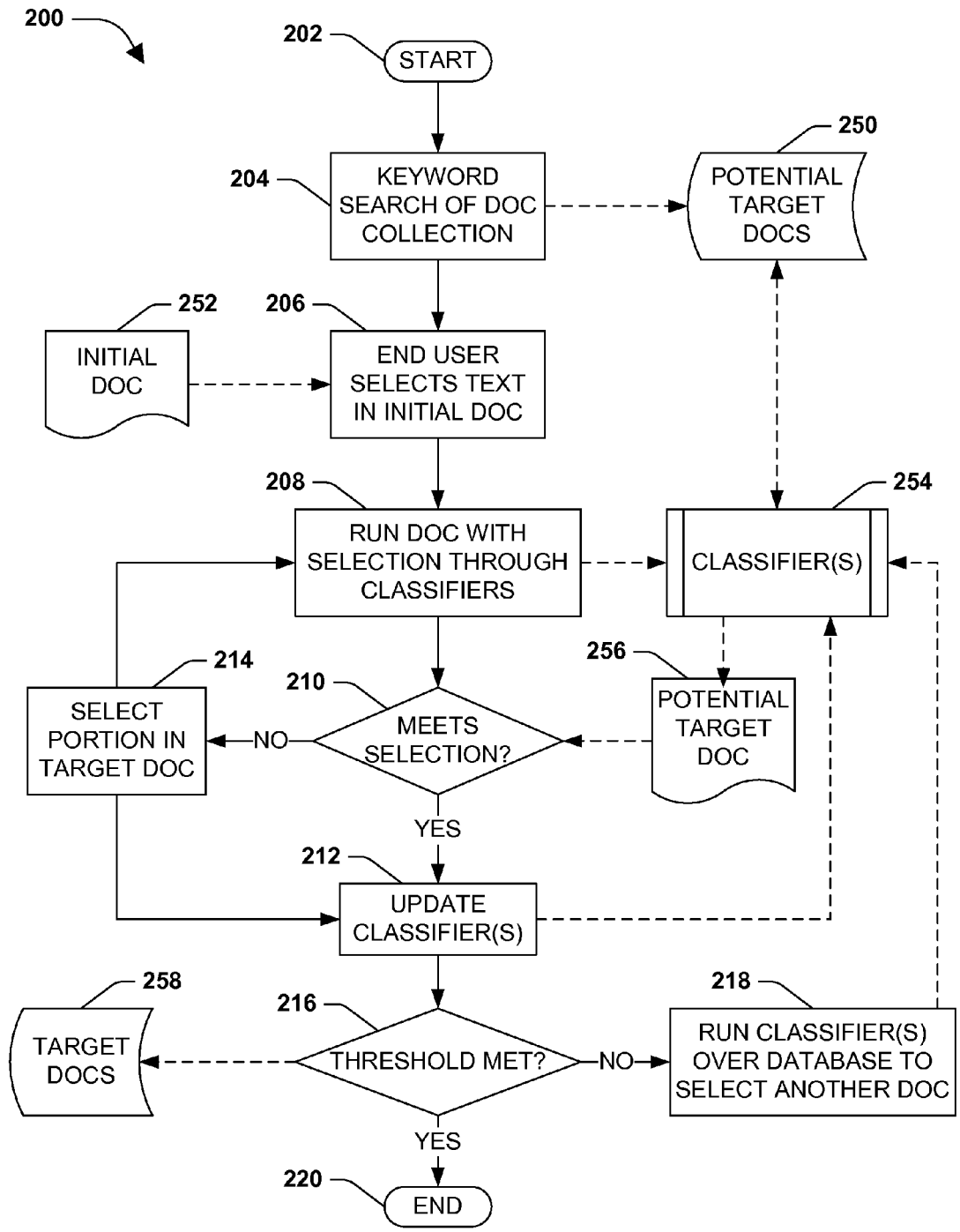
FIG. 2 is a flow diagram illustrating an exemplary embodiment of an implementation of a method for document searching by semantic content.

FIG. 2 is a flow diagram illustrating an exemplary embodiment 200 of an implementation of a method for document searching by semantic content. The exemplary embodiment 200 begins at 202 and involves performing a keyword search of a document collection, at 204. For example, a document collection may comprise an enterprise database, a collection of distributed databases, or documents from the Internet. In this embodiment, for example, a keyword search can be performed that comprises words that may be found in documents that comprise an end-user's desired semantic content.

As an example, a hospital administrator may wish to identify those patients for which the doctor has recommended a follow-up visit, such as to identify if a follow-up occurred, and/or what was the result of the follow-up. In this example, the documents stored by the hospital may run into the millions, and performing merely a semantic content search on this sized document collection may be cumbersome. Therefore, the administer can conduct a keyword search of the collection, such as using the words "follow-up," "re-examine," "return," and some others that have a similar meaning. The results of the keyword search can be used populate a target database, comprising potential target document 250, which can be search from semantic content, for example.

At 206, in the exemplary embodiment 200, the end-user can select desired text (e.g., comprising desired semantic content) in an initial document 252. As an example, the hospital administrator may identify a document that contains a doctor's recommendation that "the patient return for a check-up with one month." In this example, the administrator can select this portion of the doctor's report as comprising the desired semantic content for their semantic content search. At 208, the initial document with the selected text is run through the classifiers 254.

In one embodiment, running the document through the classifiers 254 comprises instructing the classifiers to find the selected type of text in a document in the target document database 250. A plurality of trained classifiers 254 can be used concurrently to retrieve potential target documents 256 from the database. In one embodiment, the end-user may identify which of the plurality of classifiers has a desired accuracy rate for retrieving potential target documents 256 for the desired semantic content. In this embodiment, the identified classifier may be used to retrieve target documents from the database for the desired semantic content, for example, so that the retrieval is performed more quickly, and with less error.

In another embodiment, a second classifier may be used to cross-validate a potential target document retrieved by a first classifier. Further, a combination of two or more classifiers can be identified that has a desired accuracy rate for retrieving potential target documents for a desired semantic content. In this embodiment, the identified combination of classifiers can then be used to retrieve documents from the database for the desired semantic content.

Figure 3:
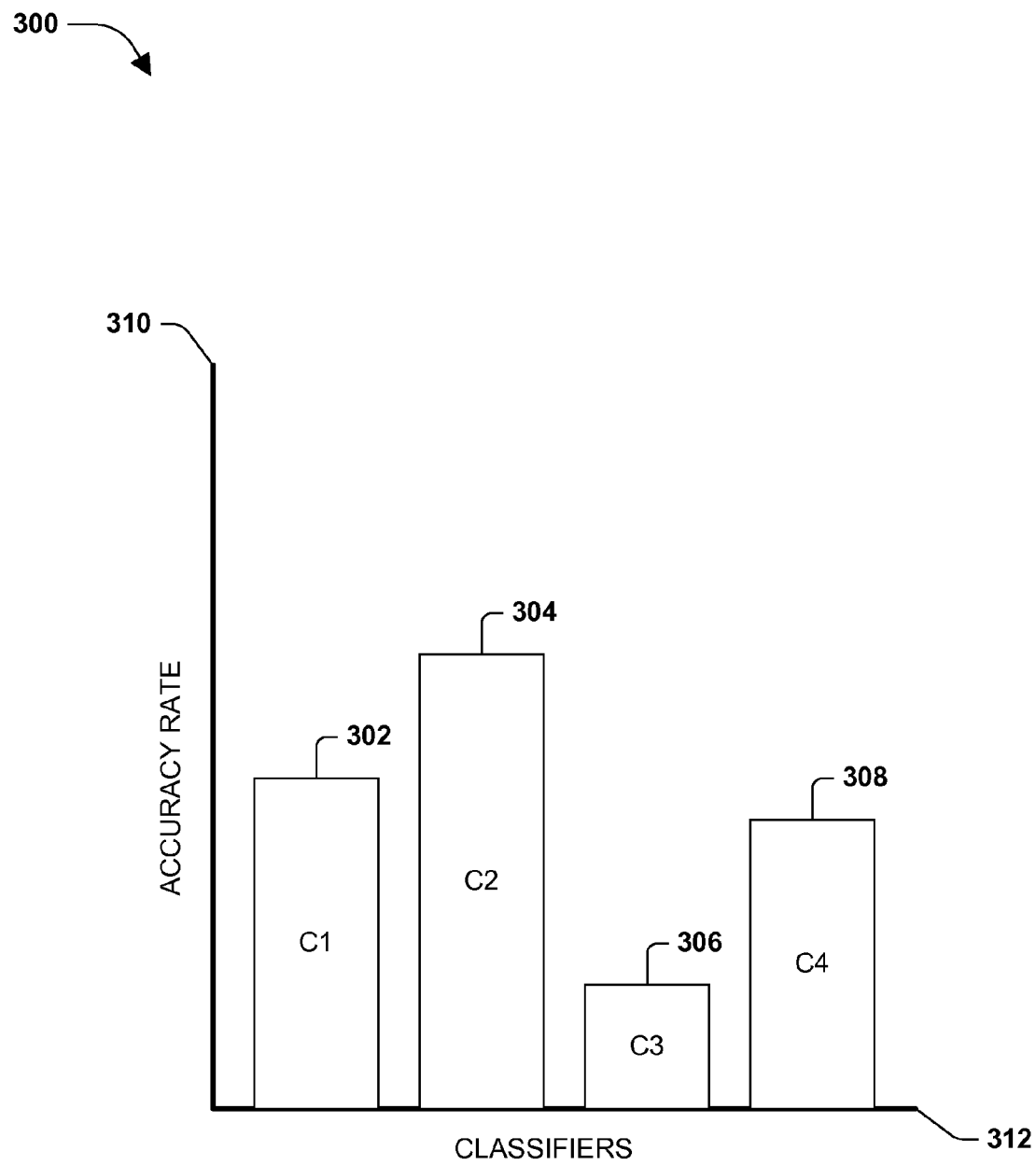
FIG. 3 is an illustration of an example graph that may be used to visually identify an accuracy rate of classifiers.

FIG. 3 is an illustration of an example graph 300 that may be used to visually identify an accuracy rate of classifiers. For example, a graph such as the example 300 may be displayed to an end-user while they are training the classifiers to retrieve documents comprising their desired content, so that the user may see how well the classifiers are performing. In the embodiment 300, an accuracy rate is represented by the vertical line 310, and the classifiers are represented along the horizontal 312. In this example, four classifiers 302-308 are being used to identify target documents.

Based on whether the classifier has correctly identified the content and/or document the accuracy rate 310 can be determined for the respective classifiers. In this example, the classifier C2 304 appears to have a highest accuracy rate. Therefore, a user may decide to merely utilize C2 304 to perform the target document retrieval for the particular semantic content. As an example, different semantic content and/or different types of documents may yield different results of accuracy for classifiers. Therefore, in one example, classifier C2 304 may not yield a same accuracy rate for different content and/or documents.

Returning to FIG. 2, a potential target document 256 is retrieved from the database 250. At 210, it is determined whether the potential target document meets the selection criteria, for example, such that the document comprises selected content that corresponds to the desired semantic content selected by the end-user. If the second portion, found in the potential target document 256, has the same semantic content as the first portion, selected by the end-user in the initial document, the end user can indicate that the classifiers have correctly identified the desired semantic content in the target document, and at 212, the classifiers 254 can be updated with this information.

That is, in one embodiment, user input from potential target documents returned by the one or more classifiers can be used to update the one or more classifiers. In this way, for example, the classifiers are trained to identify the appropriate documents that comprise the desired semantic content. Further, after updating the classifiers with an indication that the retrieval was correct, the one or more classifiers can be run over the database again to select a third potential target document 256. This process can be iterated over the database to retrieve a plurality of appropriate target documents.

However, at 210, if the retrieved target document 256 does not identify content that has the same semantic meaning as the end-user selected content, at 214, the user can select a portion of the returned document that comprises the desired semantic content. For example, the end-user may have selected a social security number (SSN) in the initial document, intending for the classifiers to retrieve SSNs from the documents in the database 250. However, after running the initial document through the classifiers, the potential target document 256 identified a telephone number. In this example, the end-user can then indicate that the classifier(s) (e.g., one or more of them) incorrectly identified the semantic content, and then highlight the correct information, the SSN in the document.

The corrected document can be run through the classifiers 254 again, at 208, to retrieve a second potential target document 256. In one embodiment the portion of the potential target document 256 (second portion) identified by the classifiers 254 may not have the same semantic content as the first portion, and the potential target document may not comprise content that has the same semantic content of the portion of the initial document selected by the user (first portion). That is, the document returned may not have any matching content for the user to select for rerunning through the classifiers.

In this embodiment, the end user can indicate that the first potential target document does not comprise content that has the same semantic content of the first portion, and the classifier(s) can be updated with this information, at 212. Further, the one or more classifiers can then be run over the database 250 to select another potential target document 256 (third potential document). As an example, if this document meets the selection criteria, at 210, the classifiers can be updated again to facilitate training them to identify the appropriate semantic content.

In one embodiment, the end-user may provide input to the classifier training for updating the classifiers (e.g., making them more accurate). For example, for respective documents the end-user may indicate the document retrieved from the database by the one or more classifiers comprises desired semantic content. Further, they may indicate that the document retrieved from the database by the one or more classifiers does not comprise desired semantic content. Additionally, they may provide a selected portion of the document retrieved from the database by the one or more classifiers, where the selected portion comprises desired semantic content.

In this embodiment 200, a threshold may be set for the classifiers when retrieving target documents, for example. In this embodiment, a plurality of documents can be run through the one or more classifiers until a desired threshold is reached, which can be determined at 216. A desired threshold may comprise different criteria, which may be selected by the end-user, or automatically set (e.g., by default).

In one embodiment, the plurality of documents can be run through the one or more classifiers until a desired document selection accuracy is reached for desired semantic content. For example, a user may wish that the document retrieval is one hundred percent accurate, as the information is critical; or may be satisfied with a ninety percent accuracy where the accuracy is not as important.

Further, in another embodiment, the plurality of documents can be run through the one or more classifiers until a desired number of correct documents are retrieved without an incorrect document being retrieved. For example, the user may be satisfied when the document retrieval returns one hundred correct documents without any errors, and then may let the retriever run unsupervised. In another embodiment, the plurality of documents can be run through the one or more classifiers until a desired number of documents have been retrieved from the database. For example, the end-user may merely need one thousand document for their desired purpose, and can run the document retrieval until that number has been reached.

At 216, if the desired threshold is not met, the classifier(s) 254 are run over the database 250 to select another potential target document 256, at 218. Further, respective potential target documents that are selected and meet the selection criteria are stored in a target document database 258. If the threshold is met, at 216, the exemplary embodiment 200 ends at 220.

In one aspect, the one or more classifiers are can be decision engines that calculate a likelihood that a potential target document in the database comprises the desired semantic content. In one embodiment, a classification threshold may be provided (e.g., by the end-user or by default) for the classifier(s) that determines whether the document should be presented for end-user input. That is, for example, a type of semi-supervised training may take place where the classifier(s) present the document only when they are unsure about the classification results.

As an example, in a SVM the decisions (e.g., yes the document comprises the semantic content, or no it does not) about a document can be plotted in a matrix to determine which side of the decision matrix they fall. In this example, there may be a margin between the yes and no portion of the matrix where the SVM is uncertain about the decision. In this embodiment, for example, this margin may comprise a threshold, where the classifiers present the document to the end-user for input as to whether the document comprises the desired semantic content. That is, the desired threshold may comprise an uncertainty threshold for a classifier model, and the document in question is presented to the user merely when the classifier model's calculation falls within the threshold.

Figure 4:
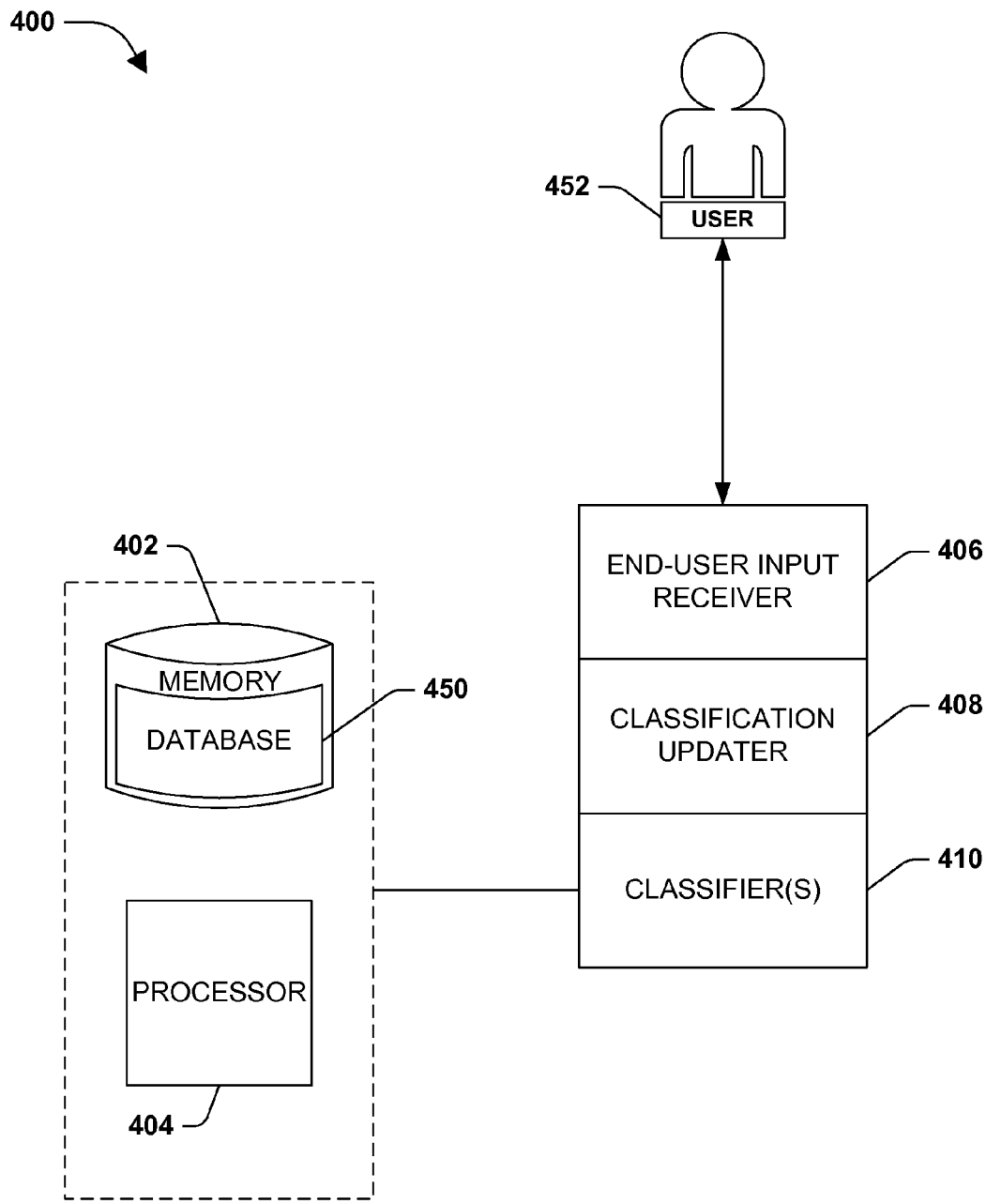
FIG. 4 is a component diagram of an exemplary system for searching by semantic content.

A system may be devised for finding documents that comprise a particular semantic content, for example. FIG. 4 is a component diagram of an exemplary system 400 for searching by semantic content. A memory component 402 stores a database 450 that comprises a plurality of potential target documents. A processor component 404 is operably coupled with the memory component 402 and is used to execute instructions for one or more classifiers 410. In one embodiment, the memory component 402 and processor component 404 may be disposed on a same computing device. In other embodiments, these components may be separately disposed, and/or may reside on a same computing device as other components in the exemplary system 400.

An end-user input receiving component 406 receives end-user 452 input for a document, such as one retrieved from the database 450, and/or an initial document that may be used to seed the database, for example. The input provided by the end-user 452 can comprise end user selection of a desired portion of a first document from the database 450, where the selected portion comprises document components of the initial document that have desired semantic content. For example, the end-user 452 may provide an initial document to seed the database 450 by selecting a portion of the initial document (e.g., text words in the document) that have a desired semantic content for the user 452.

Further, the input provided by the end-user 452 can comprise end user indication that a second document retrieved from the database 450 comprises a same semantic content as the selected desired portion of the first document. For example, the end-user may run the initial document through the one or more classifiers 410, with the selected desired semantic content, to retrieve a second document. In this example, the user 452 may review the second document to determine that it does have the same semantic content as was selected in the initial document. The user can then indicate by input that the document retrieved is correct, for example.

Additionally, the input provided by the end-user 452 can comprise end user indication that a second document retrieved from the database does not comprise a same semantic content as the selected desired portion of the first document. For example, the end-user may run the initial document through the one or more classifiers 410, with the selected desired semantic content, to retrieve a second document. In this example, the user 452 may review the second document to determine that it does not have the same semantic content (e.g., or the content selected by the classifier(s) was incorrect) as was selected in the initial document. The user can then indicate by input that the document retrieved is incorrect, for example.

One or more classifier components 410 are operably coupled with the processor component 404 and memory component 402. The one or more classifier components 410 are used to identify a second document from the database, where the second document comprises a target portion that has a same semantic content as the selected desired portion of the first document. For example, the end-user can seed the database 450 by running an initial document through the classifier component(S) 410, so that the classifier components 410 can be trained to retrieve merely those target documents from the database 450 that comprise the desired semantic content.

A classification updating component 408 is operably coupled with the end-user input receiving component 406, and is used to update the one or more classifier components 410 with the end-user input in order to identify desired semantic content. For example, the user input, such as described above, is used to train the classifier component(s) so that they may perform more accurately in identifying target documents in the database 450 that may comprise the desired semantic content.

Figure 5:
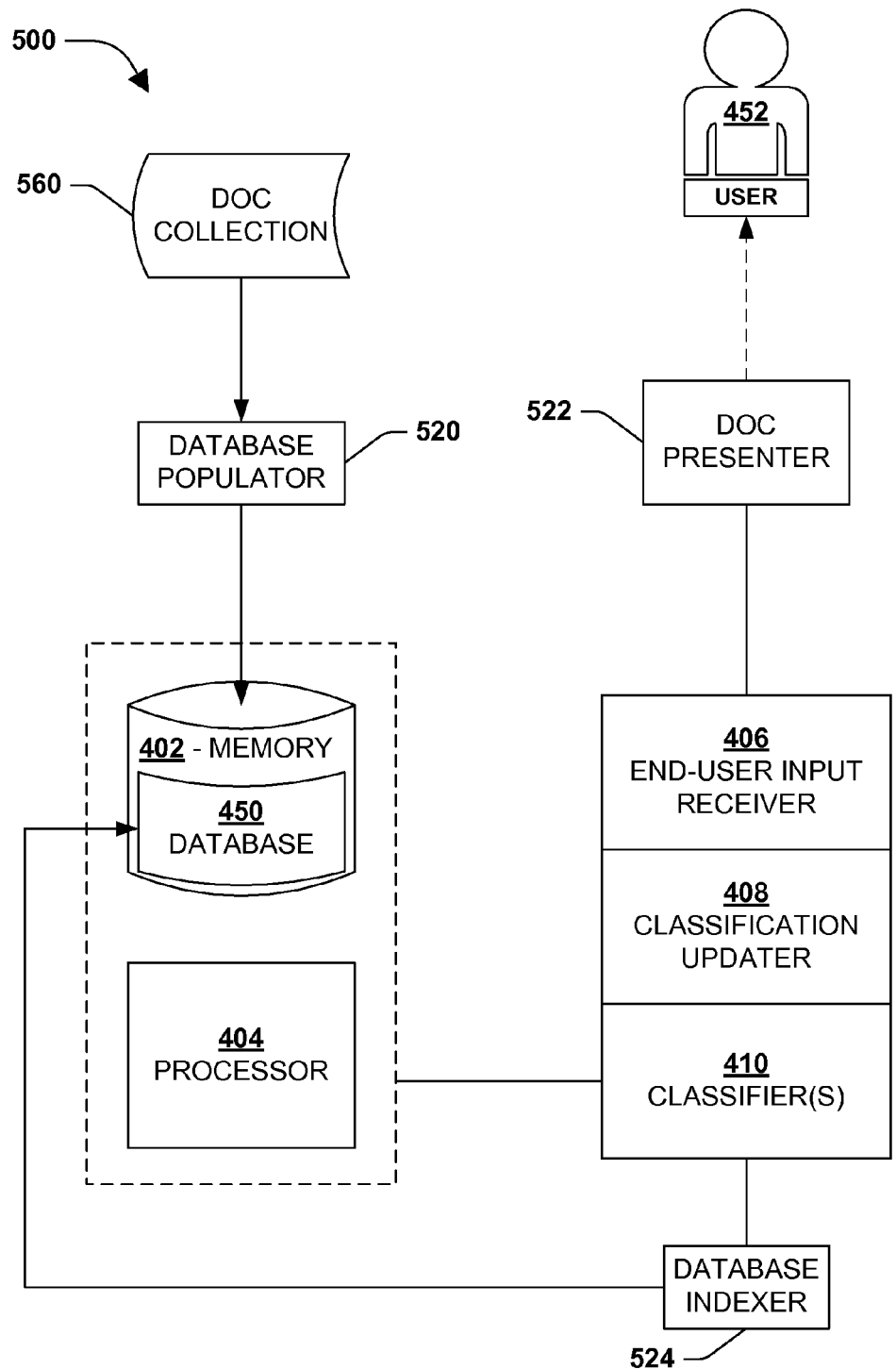
FIG. 5 is a component diagram illustrating an exemplary embodiment where one or more of the systems and/or techniques described herein may be implemented.

FIG. 5 is a component diagram illustrating one embodiment 500 where one or more systems and/or techniques described herein may be implemented. A database populating component 520 is used to populate the database 450 with potential target documents using a keyword search of a collection of documents 560. For example, using the database populating component 520 a document collection that comprises millions of potential target documents may be reduced to a few thousand by a keyword search.

A document presentation component 522 presents a document from the database 450 to the end user 452 for identification of desired semantic content. For example, a potential target document can be retrieved from the database 450 using the trained classifiers, and the document presentation component 522 can present it to the end-user 452 to determine whether it meet the desired semantic content selection criteria. In one embodiment, the document presentation component 522 may utilize a computer-based display, such as a monitor, and the end-user 452 can merely review the content on the display.

A database indexing component 524 can be used to label a document in the database 450 that comprises desired semantic content. For example, when the classifier component(s) retrieve a target document, and it is determined that is comprises the desired semantic content, the database indexing component 524 can attached metadata to the document to indicate that is has the desired semantic content. Further, in one embodiment, the database indexing component 524 may attach metadata to the portion of the target document that comprises the desired semantic content. For example, the identification of the content may facilitate in information gathering by the end-user.

In one embodiment, the database can comprise one or more sample documents (e.g., seed documents) that comprise the desired semantic content (e.g., that the end-user is searching for). In this embodiment, the one or more sample documents can be used to train the one or more classifiers 410 to identify potential target documents having a same semantic content as the desired semantic content. In another embodiment, the desired portion of a document may be text, where document components are made up of words (e.g., a text-based document of words). As an example, words may comprise numbers, symbols, or other text-based elements put together in a string.

Figure 6:
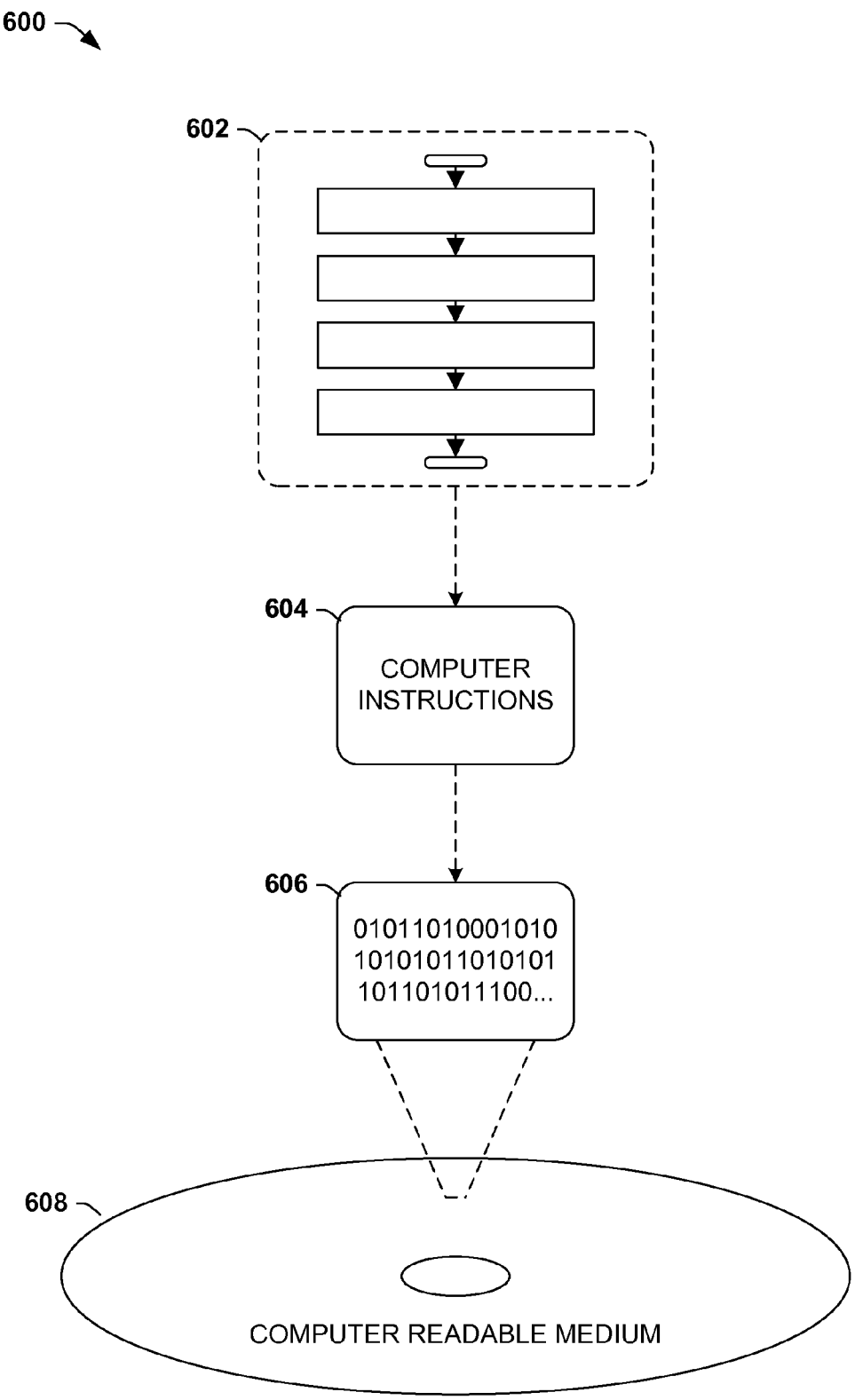
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as the exemplary method 200 of FIG. 1, for example. In another such embodiment, the processor-executable instructions 604 may be configured to implement a system, such as the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
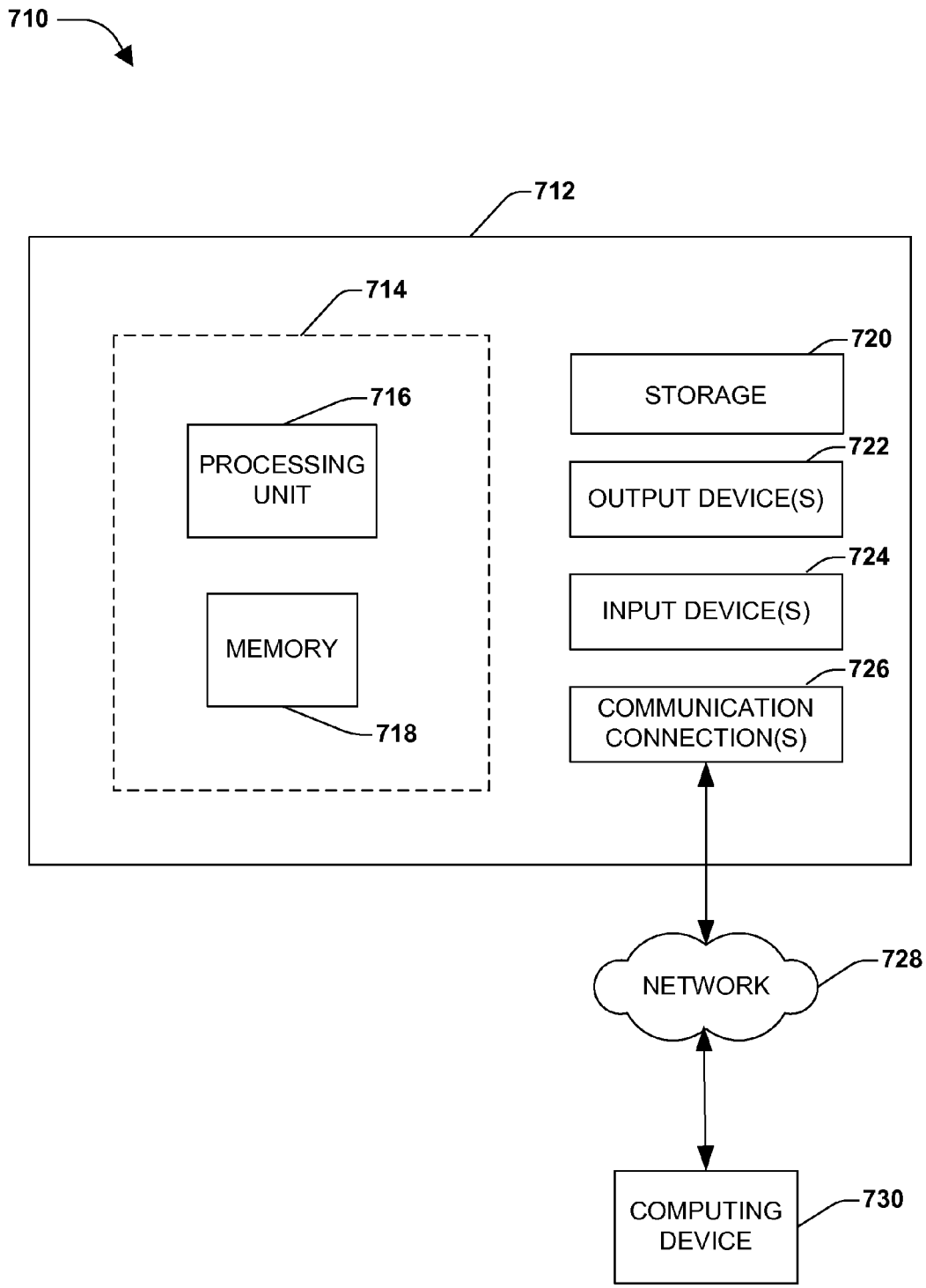
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for document searching by semantic content, comprising:
   receiving a user selection of a first portion of a document, the first portion comprising desired semantic content;
   running the document, comprising the selected first portion, through one or more classifiers to identify a first potential target document comprising a second portion;
   responsive to determining that the second portion of the first potential target document does not have the desired semantic content:
      receiving a user selection of a third portion of the first potential target document that comprises the desired semantic content; and
      running the first potential target document, comprising the selected third portion, through the one or more classifiers to identify a second potential target document comprising a fourth portion that has the desired semantic content; and
   at least one of:
      receiving user input comprising an indication that a second document identified by the one or more classifiers comprises the desired semantic content;
      receiving user input comprising an indication that the second document identified by the one or more classifiers does not comprise the desired semantic content;
      receiving user input comprising a selected fifth portion of the second document, the selected fifth portion comprising the desired semantic content;
      running a plurality of documents through the one or more classifiers until a desired document selection accuracy is reached for the desired semantic content;
      running the plurality of documents through the one or more classifiers until a desired number of correct documents are retrieved without an incorrect document being retrieved;
      running the plurality of documents through the one or more classifiers until a desired number of documents have been retrieved;
      using a second classifier to validate a document retrieved by a first classifier; or
      identifying a combination of two or more classifiers that has a desired accuracy rate for retrieving documents, and utilizing the identified combination to retrieve documents for the desired semantic content.

2. The method of claim 1, comprising identifying one or more documents by performing a keyword search on a collection of documents.

3. The method of claim 1, comprising responsive to determining that the second portion of the first potential target document has the desired semantic content, running the one or more classifiers to select a third potential target document.

4. The method of claim 1, the document comprising metadata labels that describe one or more attributes of one or more components of the document.

5. The method of claim 1, comprising utilizing user input to update the one or more classifiers.

6. The method of claim 1, comprising running the plurality of documents through the one or more classifiers until a desired threshold is reached.

7. The method of claim 1, the second document comprising at least some of at least one of the document, the first potential target document, or the second potential target document.

8. The method of claim 1, the one or more classifiers comprising one or more trained classifiers.

9. The method of claim 1, comprising presenting a potential target document to a user merely when document classification provides a result that is within a desired threshold.

10. The method of claim 9, the desired threshold comprising an uncertainty threshold for a classifier model.

11. The method of claim 1, comprising utilizing a plurality of classifiers concurrently to retrieve one or more potential target documents.

12. The method of claim 11, comprising:
identifying a third classifier that has a desired accuracy rate for retrieving potential target documents.

13. The method of claim 12, comprising utilizing the identified third classifier to retrieve one or more documents.

14. A system, comprising:
one or more processing units; and
memory comprising instructions that when executed by at least some of the one or more processing units, perform a method comprising:
receiving a user selection of a first portion of a document, the first portion comprising desired semantic content;
running the document, comprising the selected first portion, through one or more classifiers to identify a first potential target document comprising a second portion;
responsive to determining that the second portion of the first potential target document does not have the desired semantic content:
receiving a user selection of a third portion of the first potential target document that comprises the desired semantic content; and
running the first potential target document, comprising the selected third portion, through the one or more classifiers to identify a second potential target document comprising a fourth portion that has the desired semantic content; and
at least one of:
receiving user input comprising an indication that a second document identified by the one or more classifiers comprises the desired semantic content;
receiving user input comprising an indication that the second document identified by the one or more classifiers does not comprise the desired semantic content;
receiving user input comprising a selected fifth portion of the second document, the selected fifth portion comprising the desired semantic content;
running a plurality of documents through the one or more classifiers until a desired document selection accuracy is reached for the desired semantic content;
running the plurality of documents through the one or more classifiers until a desired number of correct documents are retrieved without an incorrect document being retrieved;
running the plurality of documents through the one or more classifiers until a desired number of documents have been retrieved;
using a second classifier to validate a document retrieved by a first classifier; or
identifying a combination of two or more classifiers that has a desired accuracy rate for retrieving documents, and utilizing the identified combination to retrieve documents for the desired semantic content.

15. The system of claim 14, the desired semantic content associated with at least one of a social security number or a telephone number.

16. The system of claim 14, the second document comprising at least some of at least one of the document, the first potential target document, or the second potential target document.

17. A non-signal computer readable storage device comprising instructions that when executed, perform a method comprising:
receiving a user selection of a first portion of a document, the first portion comprising desired semantic content;
running the document, comprising the selected first portion, through one or more classifiers to identify a first potential target document comprising a second portion;
responsive to determining that the second portion of the first potential target document does not have the desired semantic content:
receiving a user selection of a third portion of the first potential target document that comprises the desired semantic content; and
running the first potential target document, comprising the selected third portion, through the one or more classifiers to identify a second potential target document comprising a fourth portion that has the desired semantic content; and
at least one of:
receiving user input comprising an indication that a second document identified by the one or more classifiers comprises the desired semantic content;
receiving user input comprising an indication that the second document identified by the one or more classifiers does not comprise the desired semantic content;
receiving user input comprising a selected fifth portion of the second document, the selected fifth portion comprising the desired semantic content;
running a plurality of documents through the one or more classifiers until a desired document selection accuracy is reached for the desired semantic content;
running the plurality of documents through the one or more classifiers until a desired number of correct documents are retrieved without an incorrect document being retrieved;
running the plurality of documents through the one or more classifiers until a desired number of documents have been retrieved;
using a second classifier to validate a document retrieved by a first classifier; or
identifying a combination of two or more classifiers that has a desired accuracy rate for retrieving documents, and utilizing the identified combination to retrieve documents for the desired semantic content.

18. The non-signal computer readable storage device of claim 17, the desired semantic content associated with at least one of a social security number or a telephone number.

19. The non-signal computer readable storage device of claim 17, the second document comprising at least some of at least one of the document, the first potential target document, or the second potential target document.

20. The non-signal computer readable storage device of claim 17, the document comprising metadata labels that describe one or more attributes of one or more components of the document.

* * * * *